United States Patent
Yousaf et al.

(10) Patent No.: US 11,128,705 B2
(45) Date of Patent: Sep. 21, 2021

(54) APPLICATION FUNCTION MANAGEMENT USING NFV MANO SYSTEM FRAMEWORK

(71) Applicant: NEC Europe Ltd., Heidelberg (DE)

(72) Inventors: Faqir Zarrar Yousaf, Leimen (DE); Fabio Giust, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 107 days.

(21) Appl. No.: 15/705,282

(22) Filed: Sep. 15, 2017

(65) Prior Publication Data

US 2019/0089780 A1    Mar. 21, 2019

(51) Int. Cl.
| | |
|---|---|
| H04L 29/08 | (2006.01) |
| G06F 9/455 | (2018.01) |
| G06F 9/50 | (2006.01) |
| G06F 8/61 | (2018.01) |
| H04L 12/24 | (2006.01) |

(52) U.S. Cl.
CPC ............ *H04L 67/1095* (2013.01); *G06F 8/63* (2013.01); *G06F 9/455* (2013.01); *G06F 9/45533* (2013.01); *G06F 9/5005* (2013.01); *G06F 9/5077* (2013.01); *H04L 41/20* (2013.01); *H04L 41/5051* (2013.01); *H04L 67/327* (2013.01); *H04L 41/5048* (2013.01);
(Continued)

(58) Field of Classification Search
CPC ... H04L 67/1095; H04L 41/20; H04L 67/327; G06F 9/5005
USPC ........................................................ 709/203
See application file for complete search history.

(56) References Cited

U.S. PATENT DOCUMENTS

| | | | |
|---|---|---|---|
| 2016/0103698 A1* | 4/2016 | Yang | ...................... G06F 11/202 |
| | | | 714/4.11 |
| 2016/0212016 A1 | 7/2016 | Vrzic et al. | |

(Continued)

FOREIGN PATENT DOCUMENTS

WO    WO 2017088905 A1    6/2017

OTHER PUBLICATIONS

ETSI GS MEC 011 V1.1.1 (Jul. 2017), "Mobile Edge Computing (MEC); Mobile Edge Platform Application Enablement", Jul. 2017, pp. 1-55.
(Continued)

*Primary Examiner* — Kevin S Mai
(74) *Attorney, Agent, or Firm* — Leydig, Voit & Mayer, Ltd.

(57) ABSTRACT

A method for enabling (virtualized) application functions ((V)AFs) to associate to underlying (virtualized) network functions ((V)NFs) is provided in a Network Function Virtualization (NFV) environment in which a lifecycle management (LCM) of the (V)AFs and its associations with the underlying (V)NFs and resources are managed by the NFV Management and Orchestration (MANO) system. A service request is validated by an NFV Orchestrator (NFVO) parsing an (V)AF Descriptor ((V)AFD) file within an (V)AF catalogue. An (V)AF Record ((V)AFR) instance is created having information useable to maintain a state and one or more associations of the respective (V)AF. The NFVO, in cooperation with a Virtualized Network Function Manager (VNFM), Virtualized Infrastructure Manager (VIM) and an underlying network controller of the NFV MANO system, establishes the association between the respective (V)AF and the respective underlying (V)NF(s) using the (V)AFD.

20 Claims, 11 Drawing Sheets

(52) U.S. Cl.
CPC .......... *H04L 41/5096* (2013.01); *H04L 67/10* (2013.01); *H04L 67/34* (2013.01)

(56) References Cited

U.S. PATENT DOCUMENTS

| | | | |
|---|---|---|---|
| 2017/0031986 A1* | 2/2017 | Li | ........................ G06F 16/256 |
| 2017/0048165 A1 | 2/2017 | Yu et al. | |
| 2019/0028350 A1* | 1/2019 | Yeung | ................. H04L 41/0893 |

OTHER PUBLICATIONS

ETSI GS NFV-IFA 007 V2.1.1 (Oct. 2016), "Network Functions Virtualisation (NFV); Management and Orchestration; Or-Vnfm reference point-Interface and Information Model Specification", Oct. 2016, pp. 1-130.

ETSI GS NFV-IFA 008 V2.1.1 (Oct. 2016), "Network Functions Virtualisation (NFV); Management and Orchestration; Or-Vnfm reference point-Interface and Information Model Specification", Oct. 2016, pp. 1-83.

ETSI GS NFV-MAN 001 V1.1.1 (Dec. 2014), "Network Functions Virtualisation (NFV); Management and Orchestration", Dec. 2014, pp. 1-184.

Vincenzo Sciancalepore, et al., "A double-tier MEC-NFV architecture: Design and optimization", Oct. 2016, pp. 1-7.

* cited by examiner

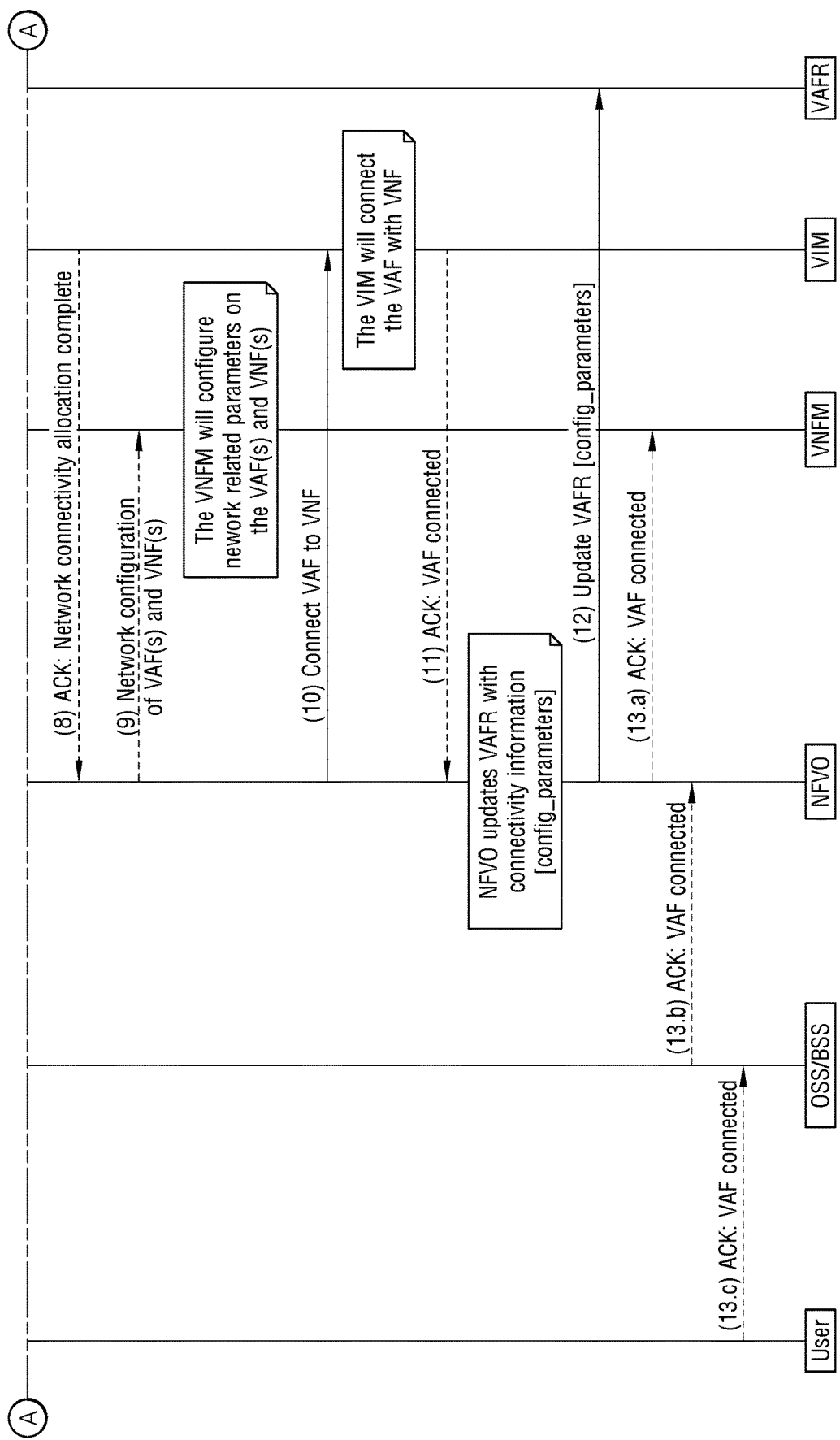

APPLICATION FUNCTION MANAGEMENT USING NFV MANO SYSTEM FRAMEWORK

FIELD

The present invention relates to a method and system that enables Virtualized Application Functions (VAFs) to associate to underlying Virtualized Network Functions (VNFs) to extend the scope of, and/or to provide relevant services to users, the Management and Orchestration (MANO) system and/or the VNFs themselves. The present invention is applicable to both virtualized and non-virtualized Application Functions (AFs).

BACKGROUND

The European Telecommunications Standards Institute Industry Specification Group (ETSI ISG) for Network Function Virtualization (NFV) has proposed a management and orchestration (MANO) framework called NFV MANO for the management and orchestration of NFV resources, both physical and virtual. These resources include infrastructure resources such as compute, network, memory, storage etc. which are virtualized and abstracted to higher layer virtualized functions and virtualized services. A virtualized function can be a VNF that may run a less complex network function, such as a firewall, load balancer, switching/routing function or a more complex function, such as a virtual Evolved Packet Core (vEPC). An example of a virtualized service is a Network Service (NS) that is composed of one or more VNFs that are interconnected using Virtual Links (VL). The NS is characterized by a VNF Forwarding Graph (VNFFG) that references the VLs, VNFs and the connection points, and specifies the topology. The ETSI ISG NFV MANO framework is illustrated in FIG. 1 and is composed of three main functional blocks, namely:
1. Virtualized Infrastructure Manager (VIM)—for the management of NFV Infrastructure (NFVI) resources like compute, network, storage, memory etc.
2. VNF Manager (VNFM)—for the Lifecycle Management (LCM) of VNF(s) that are deployed and instantiated over the NFVI
3. NFV Orchestrator (NFVO)—for the service and resource management and orchestration of the NSs that are formed by chaining various VNFs and characterized by the VNFFG.

Besides the traditional Fault, Configuration, Accounting, Performance, Security (FCAPS) management, the ETSI ISG NFV MANO framework is designed to provide the LCM of the VNFs and NS. The NS is composed of one or more VNFs and/or VNF Components (VNFC) of different types that are interconnected via VLs and the interconnection between the VNF(C)s are characterized by the VNFFG. The VNFFG is static and a new NS is created whenever a VNF is added to or removed from an NS and this changed NS will be characterized by a new VNFFG. In other words, the VNFFG represents a tight-coupling between the VNFs that are interconnected to provide a certain NS.

One of the objectives of an NS could be to provide network related functionalities to higher layer AFs. These higher layer AFs, that may be virtualized and/or non-virtualized, could rely on the functional/operational characteristics of the NS or on one or more of its constituent VNFs. For example, multimedia applications rely on the underlying network functions/NSs for providing connectivity requirements amongst other things. Vice versa, the VNFs and/or the NS(s) may also utilize the functions provided by the AFs for their own operational/functional support, for example, traffic analytic functions that may analyze Key Performance Indicators (KPIs) of VNF(s). In this respect, the AFs and the underlying VNF(s)/NS(s) could exchange service related primitives. Moreover, the AF(s) can also support user facing services via API(s) to the user(s), and can serve as an entry point towards the underlying NS.

The AFs are not part of the VNFFG and are loosely coupled to the NS. This means that the presence or absence of an AF will have no impact on the functional role of the underlying NS, nor on the VNFFG, but it may utilize specific parameters and/or information from the NS (or one or more of its VNFs) in order to provide (value added) functionalities/services to higher entities. Or the AFs may provide functionalities/services that may be used by the VNF(s) of a NS to enrich the functionalities/services provided by them. In other words, the AFs form an overlay over the VNFs or the NS. This concept and the relationship between the NS and the AFs is illustrated in FIG. 2, in which the AFs are Virtualized AFs (VAFs).

SUMMARY

In an embodiment, the present invention provides a method for enabling (virtualized) application functions ((V)AFs) to associate to underlying (virtualized) network functions ((V)NFs) in a Network Function Virtualization (NFV) environment in which a lifecycle management (LCM) of the (V)AFs and its associations with the underlying (V)NFs and resources are managed by the NFV Management and Orchestration (MANO) system. A service request is received indicating a type of application service and at least one of a (V)NF or a network service (NS). The service request is validated by an NFV Orchestrator (NFVO) parsing an (V)AF Descriptor ((V)AFD) file within an (V)AF catalogue. The (V)AFD is a deployment template having information on features, services, capabilities, operations, interfaces offered by a respective (V)AF, and connectivity, resource and interface requirements useable in the NFV MANO system to establish association between the respective (V)AF and at least one respective underlying VNF. The respective (V)AF is deployed and substantiated by the NFVO. An (V)AF Record ((V)AFR) instance is created having information useable to maintain a state and one or more associations of the respective (V)AF. The NFVO in cooperation with a Virtualized Network Function Manager (VNFM), Virtualized Infrastructure Manager (VIM) and an underlying network controller of the NFV MANO system establishes the association between the respective (V)AF and the at least one respective underlying (V)NF using the (V)AFD. The NFVO performs, over existing standard reference points of the NFV MANO system, LCM of the respective (V)AF and the associations of the respective (V)AF.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 9B is a continuation of FIG. 9A from line A-A.

DETAILED DESCRIPTION

Figure 1:
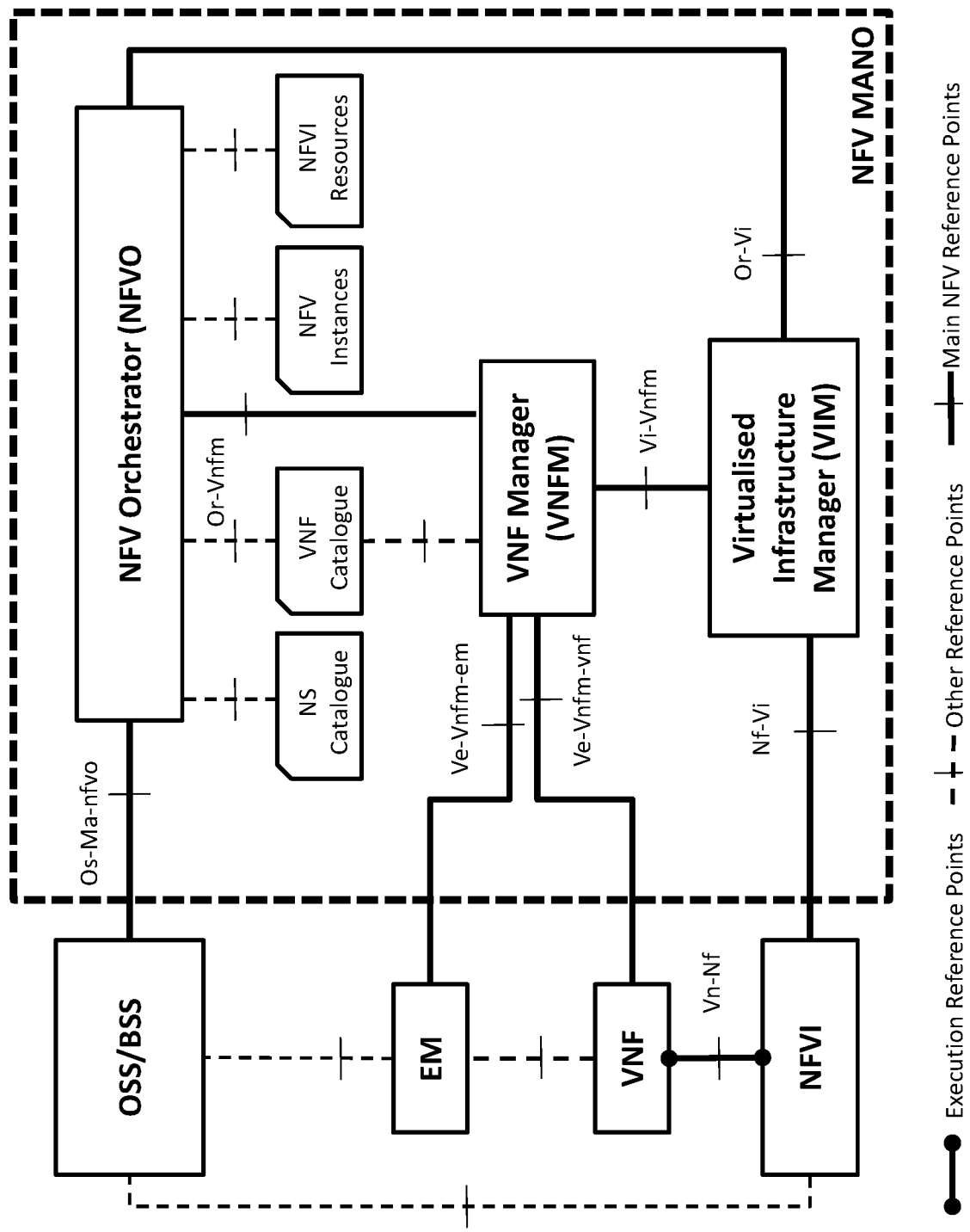
FIG. 1 is a schematic overview of the NFV MANO architecture.
Figure 2:
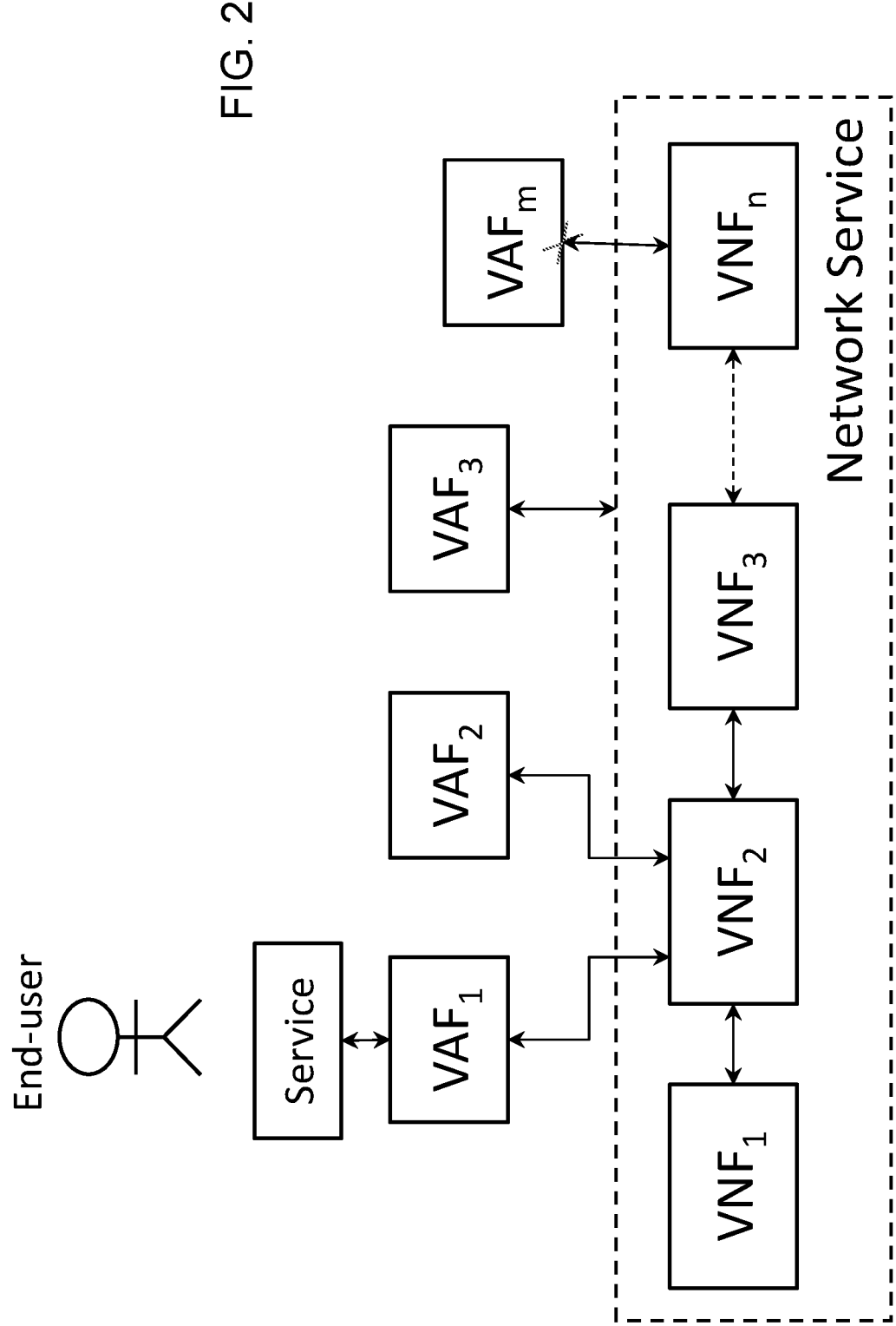
FIG. 2 is a schematic view of a service instance comprising (V)AFs as an overlay on VNFs.

The present invention provides an improvement to computer system and network functionality for Network Function Virtualization (NFV) MANO, by enabling a standard NFV MANO system to manage the lifecycle of the VAF and its associations to underlying VNF(s) over existing reference points.

The inventors have recognized the problem that the NFV MANO is able to manage and orchestrate the VNFs and the NSs, but is not able to manage (V)AFs in conjunction with the VNF/NS within the NFVI. In order to address this problem, a proposal was made in International Patent Application Publication No. WO 2017/088905 which is incorporated by reference herein in its entirety, that extended the NFV MANO architecture with a new VAF Manager (VAFM) functional entity. This required introducing new interfaces to existing NFV reference points, or as an alternative, to add new reference points to the current standard NFV MANO system architecture.

In contrast, embodiments of the present invention provide an improved method and system which enables the existing NFV MANO framework to manage the VAFs within the NFVI without any impact on the existing MANO architecture. More specifically, embodiments of the present invention provide technical solutions to manage the unique relationship between the VAFs and VNF/NS that is characterized by the loose coupling between them, where the connectivity between the VAF and VNF/NS is dynamic in the sense that the association of a VAF can be changed any time without any impact on the functional/operational capabilities of the VNF/NS itself and without any changes to the VNFFG. This entails the requirement to manage the LCM of such links. It may be noted that while the ETSI ISG NFV defines LCM on the VNF and NS entities, an embodiment of the present invention provides to perform LCM of the association between the VAF and the VNFs/NS.

Embodiments of the method and system also enable the ETSI ISG NFV MANO system to manage AFs (both physical and virtual) and its association with the underlying VNF(s)/NS. For the sake of simplicity and clarity of description, embodiments are described with respect to a virtualized AF (VAF) instance. However, it is to be understood that embodiments of the method and system can be applied to non-virtualized AFs as well.

As mentioned above, a VAF is an entity that provides service(s) to a user, the VNF/NS and/or the MANO system itself by associating with the underlying VNF/NS. The term "association" is used here to differentiate the connectivity between VAF and VNF(s) from the nature of connections between the VNFs that are tightly coupled with each other over VLs forming a NS. This interconnectivity between VNFs are represented by a VNFFG and is composed to represent the topology. They are considered tightly coupled because they are characterized by a VNF Forwarding Graph Descriptor (VNFFGD). A VNFFG is a graph of logical links connecting VNF nodes for the purpose of describing traffic flow between them. The VNFFG remains unchanged (i.e., static) throughout the lifetime of the NS and any change in a NS (for example addition/removal of a VNF(s)) will result a new NS thereby requiring a new VNFFG.

In contrast, the connectivity between VAF and VNF(s), and also between VAF to VAF(s) are dynamic, temporary and on an as needed basis. That is, they are maintained for the required duration, and a VAF can have 1:1 or 1:N correspondence with VNF(s) or even with other VAF(s). In other words, a VAF can be associated to one or more VNFs belonging to same or different NSs. There could be use cases where multiple VAF instances are associated with a VNF. However, the process will be the same as with a single VAF instance.

Figure 3:
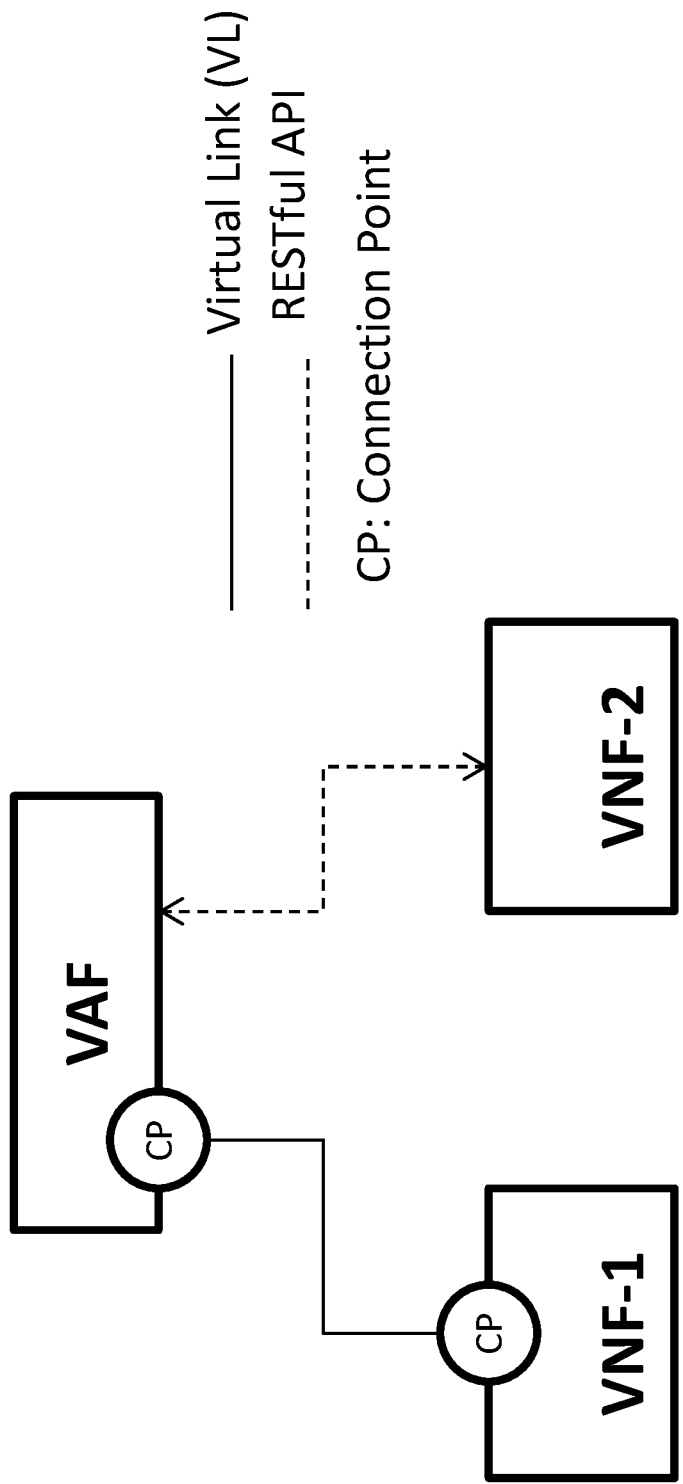
FIG. 3 is a schematic view of a VAF with a different association options according to an embodiment of the present invention.

The connectivity (i.e., association), or any change in association, between a VAF and VNF will have no impact on the functional/operational scope of the underlying VNF(s) or the VNFFG of the associated NS. Thus, the term "association" is used here to represent this dynamic and temporary, but non-invasive, nature of connectivity between the VAF and VNF(s). In other words, the association between the VAF and VNF(s) is loosely coupled as compared to the more static/permanent nature of connectivity between VNFs (and its components i.e., VNFC) in a NS. Depending on the type and properties of the VAF and VNF, the association (i.e., connection) between the two can be realized either using, but not limited to, VLs (similar to those between VNFs) or using RESTful APIs, or using a service bus for a publication/subscription mechanism or using special interfaces over specific Service Access Points (SAP) known to both VAF and VNF. The VAF and VNF can have various design features and any appropriate communication means between the VAF and VNF(s). It could also be that a VAF may support heterogeneous association types depending on the VNFs that it is associated with. For example, VNF-1 may support only VLs while VNF-2 shall only allow communication with VAF using a REST interface. This scenario is depicted in FIG. 3.

Due to this dynamic and non-temporary nature of the association, there are unique requirements for the LCM of VAF and its associations vis-à-vis the VNF(s) that must be fulfilled by the NFV MANO system. The management tasks supported by the NFV MANO system stack include the following:

Deploying and instantiating a VAF based on user request and/or MANO system requirement and/or VNF/NS requirement.

Managing Create, Read, Update and Delete (CRUD) operations on a VAF and its associations.

Associating an instantiated VAF with one or more VNF and/or NS.

Creating new associations at run-time of an already associated VAF with other VNF(s) and/or NS and/or other VAF(s), which is a unique LCM operation according to an embodiment of the present invention also referred to herein as "association spawning".

Maintaining an existing association of a VAF during the LCM operations, for example during VNF scaling or migration events.

During VNF scaling operation, such as scale-out, the VAF instance shall create/clone new association instances with itself and scaled VNF instances, which is a unique LCM operation according to an embodiment of the present invention also referred to herein as "association cloning".

During VNF migration operation, the VAF and/or its association shall also migrate in order to maintain the association, which is a unique LCM operation according to an embodiment of the present invention also referred to herein as "VAF/association migration".

Similar to a VNF, a VAF instance can also be scaled. For instance, if the computational requirements of a VAF associated to VNF(s) increases, then the VAF instance can be scaled to fulfil the computational requirements. This may result in a N:1 (or N:N) association between VAF and VNF instance(s). In other words, with VAF scaling will result in "association scaling" as well.

Due to NS shutdown or other reasons, the VAF association can be transferred from one VNF/NS to another, hence "association transfer" is considered as well. This differs from the above-described migration concept because, in this case, the nature of the target VAF/NS changes after the operation.

Similarly, during a VNF delete operation the associated VAF instance and/or its association are also terminated. The VAF instance is only terminated if it does not have an active association with any other VNF(s).

During VNF update/upgrade operation, or during the re-instantiation of a VNF, the existing association is re-evaluated and re-validated.

In order to fulfil the above requirements, the NFV MANO system framework is provided with precise information about the VAFs, and once active (i.e., an association has been established with VNF(s)), it must maintain a state information about the VAF association(s). For this purpose, according to an embodiment of the present invention, the following two repository elements are made part of NFV MANO:

VAF Descriptor (VAFD)
VAF Record (VAFR)

Figure 4:
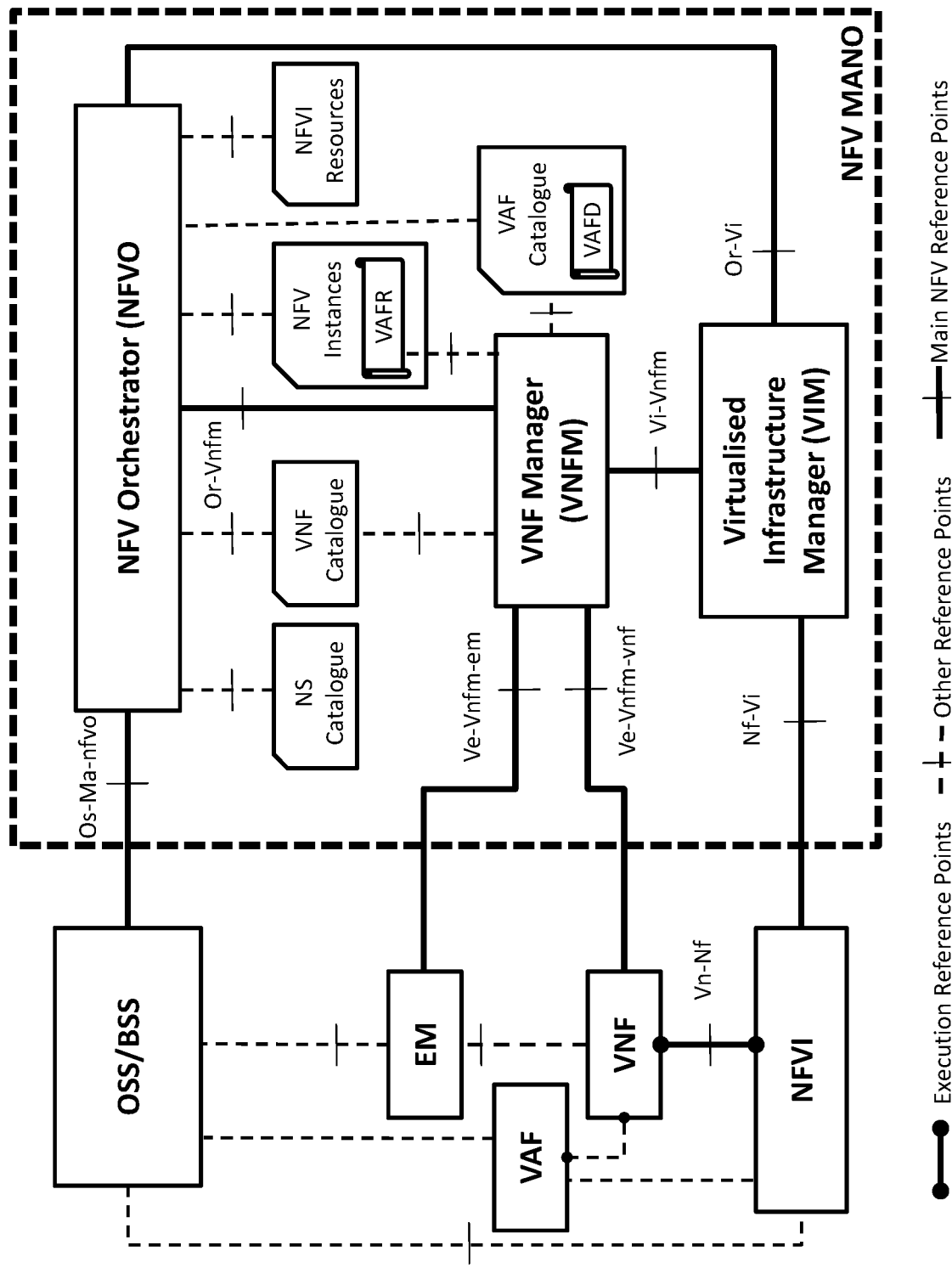
FIG. 4 is a schematic overview of the NFV MANO architecture with a VAF Catalogue and VAF Record according to an embodiment of the present invention.

FIG. 4 depicts VAFD and VAFR within the NFV MANO system architecture. These two repository elements are accessible to both the NFVO and the VNFM.

According to an embodiment of the present invention, it is assumed that there is already a mechanism in place to perform the LCM operations of the VAF entity itself. For example, such a mechanism may leverage the concepts in WO 2017/088905 wherein a new Ve-Vafm-vaf reference point between the VAF and a newly constituted VAFM is provided. Alternatively, an existing generic VNFM may be suitable for the purpose, provided the interfaces of the Ve-Vnfm-vnf reference point are sufficient. In this regard, reference is made to ETSI GS NFV-IFA 007 V2.1.1 "Network Functions Virtualisation (NFV); Management and Orchestration; Or-Vnfm reference point—Interface and Information Model Specification", October 2016 and ETSI GS NFV-IFA 008 V2.1.1 "Network Functions Virtualisation (NFV); Management and Orchestration; Ve-Vnfm reference point—Interface and Information Model Specification", October 2016. As indicated in FIG. 4, a VAF can also be managed via the Operation Support System/Business Support System (OSS/BSS), but that would require additional requirements on the Os-Ma-nfvo reference point. According to an embodiment of the present invention, it is assumed that the VNFM is capable of managing the Lifecycle operations and the associations of the VAF over the Ve-Vnfm-vnf reference point. There are no new additional MANO functional blocks or any changes to the base standard NFV MANO system according to an embodiment of the present invention.

A VAF Descriptor (VAFD) is a deployment template which describes a VAF, at the minimum, in terms of its deployment, and also provides details on the features, services, capabilities offered by the respective VAF. It also provides information that is used by the OSS/BSS and/or NFVO to manage the VAF connections and the virtualized resources required by the VAF on the NFVI. Going beyond the VAFD definition in WO 2017/088905 the VAFD also contains connectivity and interface requirements that can be used by NFV MANO to establish association between the VAF and the NS/VNF. The VAFD is part of the newly defined VAF Catalogue that is accessible to the NFV MANO (see FIG. 4). A VAFD can also be made part of the existing VNF Catalogue. Similar to the VNF and VNFD, the VAFD is uploaded as part of the VAF on-boarding process. Table 1 provides an example of a VAFD file as an example embodiment, which contains a non-exhaustive list of some key parameters.

TABLE 1

Example of a VAFD File

| Information Elements | Type | Cardinality | Description |
|---|---|---|---|
| Id | int | 1 | ID (e.g., name) of this VAFD |
| Vendor | int | 1 | The vendor generating/provider of the VAF |
| version | | 1 | Software version of the VAF |
| service_type | enum | 1 ... N | Type of service(s) and service port that the VAF offers/provides in terms of features and capabilities. |
| interface_list | User defined | 1 ... N | The list and details of interfaces (e.g., APIs) that the VAF exposes for the VNFs, MANO and users to consume. It may also include interfaces through which the VAF can be configured and managed. |

TABLE 1-continued

Example of a VAFD File

| Information Elements | Type | Cardinality | Description |
| --- | --- | --- | --- |
| image_id | int | 1 | The id of the VAF software image in the repository used for instantiating VAF instance(s). |
| deployment_flavor | enum | 1 . . . N | Resource requirements in terms of compute, network, memory, storage etc. |
| connection_type | enum | 1 . . . N | The type of connection(s) that the VAF can support. For example, VL and/or REST APIs |
| time_to_live | int | 0 . . . 1 | The duration for which this VAF shall remain active. |
| config_template | User defined | 1 . . . N | Template for configuring the VAF upon deployment |
| performance_bounds | User defined | 1 . . . N | The KPIs to manage the performance of the VAF |

A Virtualized Application Function Record (VAFR) is like a state table that is created soon after a VAF has been instantiated. This record will include sufficient information to allow the NFV MANO system to monitor and manage the VAF instance(s) and their respective association with the underlying VNF/NS. At the minimum the VAFR will index the virtualized resources allocated to the VAF, the VNF ids with which the VAF is associated with, and the interfaces that are exposed by the VAF towards the VNF and those exposed by the VNF(s) towards the VAF. It will also indicate the type of link(s) that a VAF has established with a particular VNF, the id of such link, its characteristics, its status and the time for which the link is supposed to remain active. It may also indicate the state of association between VAFs as well. The VAFR is maintained inside the NFV MANO's NFV Instances repository (see FIG. 4). Table 2 below gives an example embodiment of a VAFD file, which contains a non-exhaustive list of some key parameters.

According to an embodiment of the present invention, both NFVO and VNFM are provided access to the VAFR and VAFD. Access to the NFVO is especially advantageous because it manages the NS (composed of multiple VNFs) while access to the VNFM for managing the VAF instance(s) in combination with NFVO and VIM. Thus, whenever there is a change in the NS, for example topological/functional/operational change of a NS and/or due to the migration, scaling etc., of constituent VNF(s), then the relevant VAFs and their associations to the respective VNF(s) will also be managed in order to ensure the continuation of the VAF(s) association(s) with the NS/VNF(s). Having access to both VAFR and VAFD, both the NFVO and VNFM will be able to read/update relevant parameters, for example, VAF state information in the VAFR, and will enable them to ensure a continued association between VAF(s) and VNF(s).

Although the individual VAFs can be managed by the MANO functional blocks via the OSS/BSS (i.e., over the

TABLE 2

Example of a VAFR

| Primary Key | Secondary Key | Value (Information Element) | Type | Cardinality | Description |
| --- | --- | --- | --- | --- | --- |
| vaf_id | vnf_id OR vaf_id | exposed_interface_id | int | 0 . . . N | The interface(s) exposed by the Primary VAF towards VAF/VNF indicated by the Secondary Key |
| | | interface_id | int | 0 . . . N | The interface(s) exposed by the associated VAF/VNF indicated by Secondary Key towards the Primary VAF |
| | | link_type | string | 1 | The type of link that defines the association between the VAF and VNF |
| | | link_id | int | 1 | The unique id of the link that defines the association between the VAF and VNF |
| | | time_to_live | int | 0 . . . 1 | The time for which the link (or associating) between the VAF and VNF will remain active. |
| | | link_status | enum | 1 | Whether the link is up, down, standby. |
| | | config_parameters | User defined | 1 | The configuration parameters set for the active VAF instance. This is typically a data structure that can be defined by the user either as a Class, Extensible Markup Language (XML), or JavaScript Object Notation (JSON) notation. |
| | | lifecycle_event_list | User defined | 1 | List containing the LCM events, including the type and time of event. This is typically a data structure that can be defined by the user either as a Class, r XML, or JSON notation. |
| | | fault_event_log | User defined | 1 | A log file maintaining the list of fault events, causes and timestamps. |
| | | performance_log | User defined | 1 | A log maintaining the recorded KPI values along with timestamps. |

Os-Ma-nfvo reference point), that imposes additional requirements on the interfaces defined over the Os-Ma-nfvo reference point and, more importantly, delays. According to an embodiment of the present invention, the interfaces of the Ve-Vnfm-vnf reference point (with necessary extensions) are supported also between the VAF and VNFM in order to perform LCM related operations on the VAFs and other management tasks such as Performance/Fault/Resource/Configuration management. This assumes a "generic VNFM" and the VNFM specified by the ETSI ISG NFV has the flexibility to be sufficiently generic.

In the following, embodiments of the present invention will be explained with reference to an approved use case scenario in the ETSI ISG NFV (NFVIFA(16)000296r9).

Figure 5:
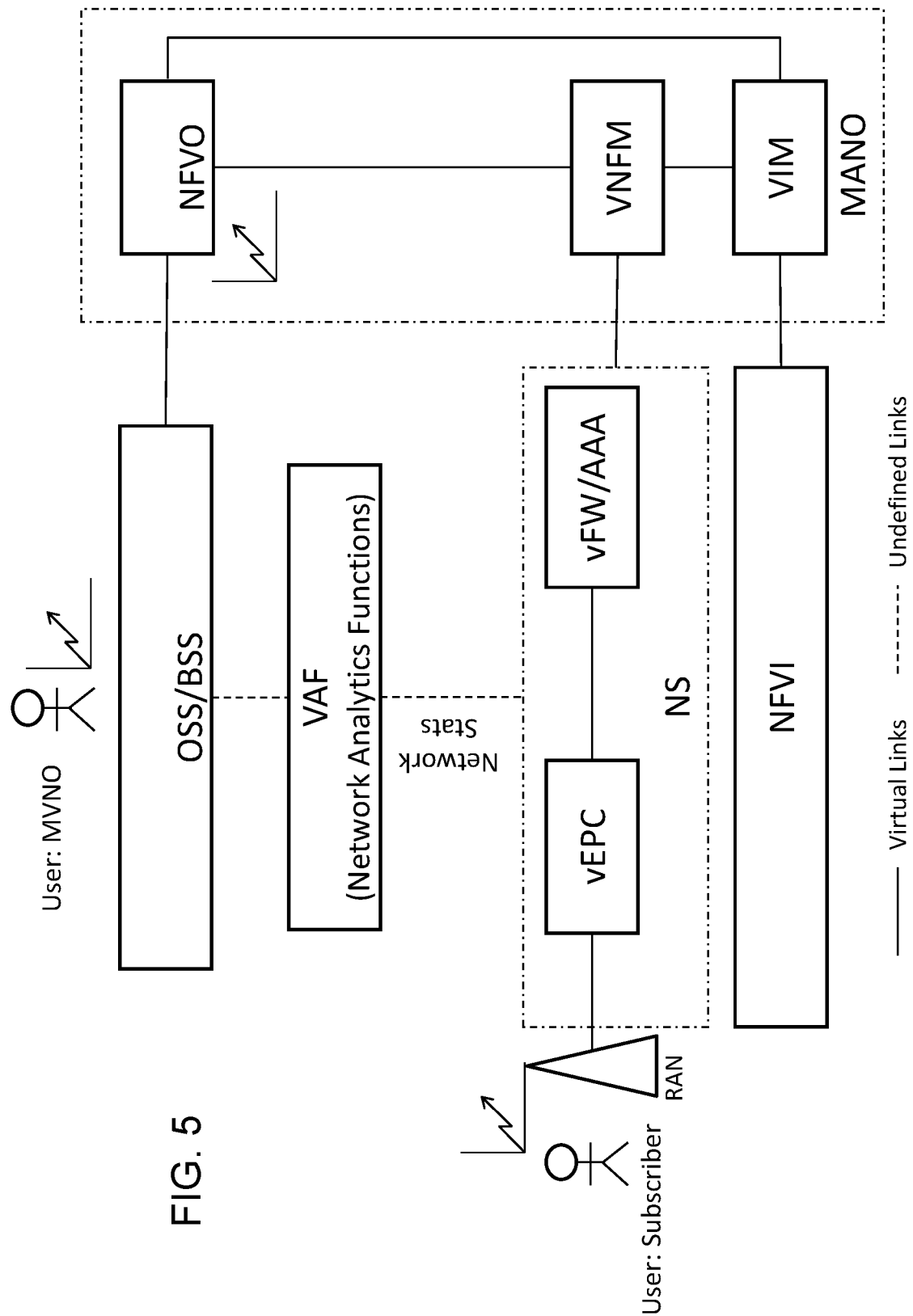
FIG. 5 is a schematic view of a use case scenario.

For the use case scenario that is depicted in FIG. 5, it is possible to take an example of a VAF that deals with providing advanced network analytics to its users. In this context, the user can be a Mobile Virtual Network Operator (MVNO), an end-user subscriber and/or the NFVO itself. The analytics are related to the NS that the MVNO owns and the end-user is subscribed to. The VAF is a fully functional entity with its own application logic, for example providing an advanced algorithm base for Big Data Analytics, with its own protocol stack for connectivity and communication purposes. In order to utilize the features offered by such a VAF, it needs to be associated to the underlying NS (or a Service Slice). The underlying NS is composed of the following VNFs inter-connected in the order of their listing:

1. Firewall (FW)/AAA Function for providing access control and management to the incoming service requests from the users.
2. vEPC for providing mobile communication services to the end-users.

The NS composed by these two types of VNFs are characterized by a VNFFG that is maintained in the NS Catalogue (see FIG. 1). In this use case, the VAF is required to be associated with all the VNFs forming the NS (i.e., the FW/AAA and vEPC VNFs) and collect performance information from which relevant network performance statistics are derived and provided to:
a. The user subscribed to the VAF in order to, for example, monitor the effectiveness of its service policies.
b. The NFVO to enable it to make optimized management and orchestration decisions based on information received by the advanced analytics offered by the VAF.

Figure 6:
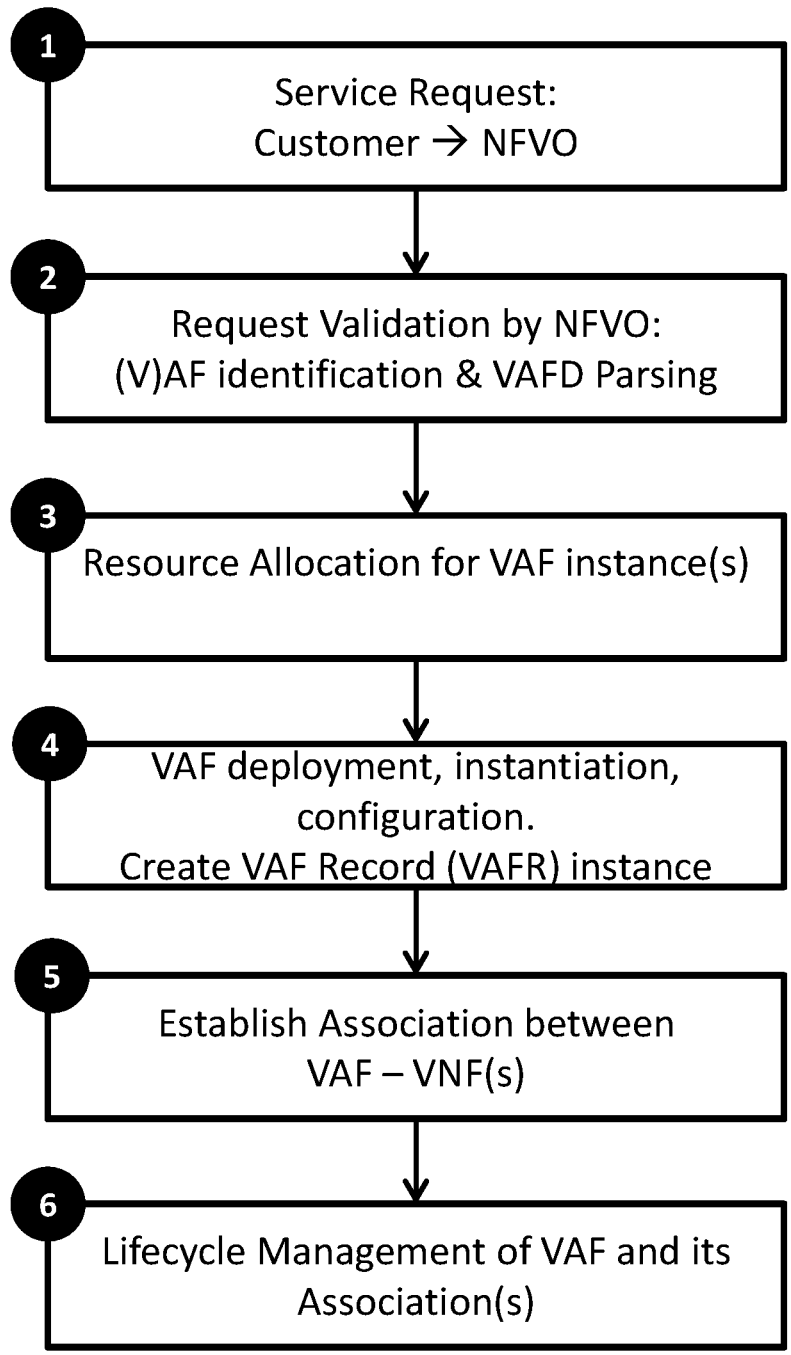
FIG. 6 is a flowchart depicting steps of a method according to an embodiment of the present invention.

FIG. 6 shows a general process overview according to an exemplary embodiment. The steps will be described with reference to the use case:
1. A service request is made by the user via the OSS/BSS indicating the type of application service it requires or wants to install at the application level. This request is handled by the NFVO. The request indicates the NS Id and/or the VNF Id with which the user wants to establish application service association. Additionally, it may also include information on the KPIs and/or the interfaces that is required to be exposed towards the VAF. In the particular use case, the user indicates the provisioning of "network analytics function" in its request and specifies the KPIs/parameters to be provided by the VNF(s) to the VAF.
2. The NFVO validates the service request by:
   a. Identifying the appropriate VAF type(s) that is based on the service type/definition indicated in the service request. In this case, the NFVO will identify the relevant VAF in the catalogue that provides the requested application service. This is indicated by the service_type parameter in the VAFD file.
   b. Parsing the VAFD file relevant to the indicated VAF and, for example, identifying the type of resources, interfaces and supported connection type.
3. Based on the parsing of VAFD, the NFVO will request the VIM to allocate resources for the VAF. This step will be skipped in case there is already an active instance of the required VAF.
4. Once the resources are allocated, the VAF will be deployed, instantiated and configured. In addition, a VAFR instance will be setup for maintaining state information for this application service instance.
   a. As part of the instantiation process, the NFVO will pass the configuration_template to the requesting user in order for it to configure the VAF (for example, via the OSS/BSS over the Os-Ma-nfvo reference point) with relevant parameters. The user will inform the NFVO via the OSS/BSS the configuration parameters of the VAF, which will be maintained inside the VAFR. The configuration parameters shall also indicate the VAF interface(s) that the user requires to be exposed towards the VNF(s). The NFVO will also update the VAFR with the interfaces that the VNF(s) is (are) required to expose towards the VAF for the provisioning of required parameters.
   b. The VAF instances will be configured either via the OSS/BSS or it may be done by the VNFM over the Ve-Vnfm-vnf reference point.
5. The NFVO will be able to determine the appropriate association method, i.e., via VL or via REST API or via some other method, and will establish an association (i.e., connectivity) between the VAF and two VNFs via the "network controller", which is defined in ETSI GS NFV-MAN 001 V1.1.1, "Network Functions Virtualisation (NFV); Management and Orchestration," December 2014 as an entity for providing virtual connectivity services. The process of association involves VNFM and VIM as discussed below. Once they are associated, the VAF and VNF(s) will exchange with each other relevant parameters via the interfaces exposed towards each other.
6. The NFVO will perform LCM of the VAF and/or its associations during the lifetime of the association when required.
   a. For example, if the NFVO decides to scale out the FW/AAA VNF, then the NFVO in cooperation with the VNFM will "clone the association" of the existing VAF to the scaled-out FW/AAA instance by creating a new association between the VAF and the new scaled-out instance of the FW/AAA VNF. The VAFR will be updated with the necessary states to reflect this event. This new association will be triggered by the NFVO towards the VIM, which is then carried out by the "network controller" to provide connectivity services as before. In addition the NFVO via the VNFM (or via the OSS/BSS) will inform the VAF of the new "clone association" event in order for the VAF to update any internal states for its operations. Advantageously, new associations can be spawned to other VNFs that are part of other NS instances.
   b. In case the FW/AAA VNF is to be migrated, then the NFVO, via the VIM and the network controller, will also ensure that the VAF remains associated with the VNF at its new location by also migrating the associations.
   c. Moreover, a VAF instance can be scaled in case the performance bounds of a VAF is being exceeded. In this case, new associations will be created with scaled VAF instance and the relevant VNFs.

In particular to the use case example discussed above, the VAF will periodically receive specified parameters and KPIs relevant to the two VNFs and based on the advanced analytics services of the VAF; advance performance values will be provided to the users and the NFVO (via the OSS/BSS or the VNFM) that the users will use for their particular purposes.

In the following, a second use case is discussed and further illustrates how an embodiment of the present invention lends itself to manage not only the associations between a VAF and a VNF, but also between a VAF and other VAF(s). This second use case is a prominent use case which comes from the Multi-access Edge Computing (MEC) scenario described by the ETSI ISG MEC, wherein third party applications run as virtual machines leveraging basic and enhanced services offered by a special computing platform, called the MEC Platform. The MEC environment is intended to run on the same virtualization infrastructure defined by ETSI ISG NFV, but considering that MEC has an extremely dynamic environment, where applications are frequently instantiated, terminated and migrated, the integration of MEC into an NFV deployment presents a number of challenges which are solved by embodiments of the present invention.

An Over-the-top (OTT) entity, a well-known provider of multimedia applications, is interested in deploying a bundle of MEC Applications to create a complex multimedia ecosystem, i.e.:
a music streaming application,
a video streaming application,
a gaming application,
a backend application to handle the user's credentials, profile and subscriptions.

In order to fulfill its business and Quality of Experience (QoE) objectives towards end-users, the multimedia ecosystem leverages:
the basic service access points offered by the MEC Platform in order to create the proper running environment for applications (See Mp1 interface ETSI GS MEC 011, Mobile Edge Computing (MEC); Mobile Edge Platform Application Enablement).
the Restful APIs of the MEC Platform's enhanced services (e.g., user equipment (UE) location, radio network information, bandwidth manager, etc.).
the application-specific interfaces designed by the application provider in order to execute the multimedia ecosystem.

Figure 7:
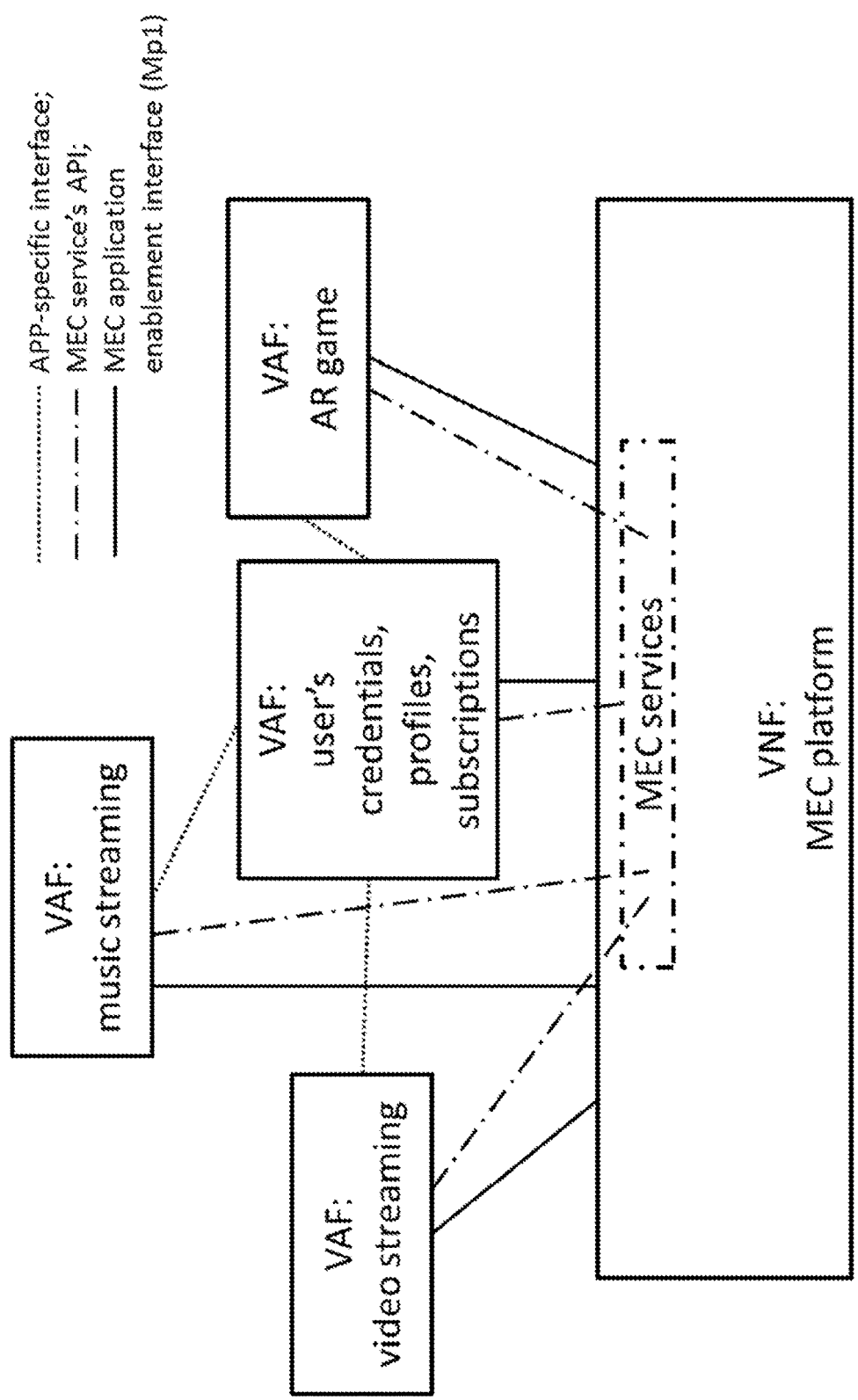
FIG. 7 is a schematic overview of connections and interfaces between mobile edge application and the mobile edge platform.

The high level interaction is depicted in FIG. 7. Whereas the MEC Platform can be deployed as a traditional VNF as part of a forwarding graph related to a MEC-enabled NS, the MEC applications are dynamically deployed on the OTT's and end user's demands. Therefore, it is desirable to treat the MEC applications as VAFs associated to VNF. The application-level and system-level interfaces are thus treated as soft links by the NFV MANO, as per the associations indicated in the VAFRs of the VAFs.

As per the steps described in the previous use case and in FIG. 6, the following procedure is obtained:
1. A hosting request for a multimedia service is made by the OTT via the OSS/BSS, indicating the type of application service it wants to install at the application level. Since this request targets the MEC System, it is handled first by the MEC Orchestrator which eventually hands it to the NFVO (note, these orchestrators can be standalone components, or integrated into a single orchestration entity). When the MEC Orchestrator passes the request onto the NFVO, it appends the VNF Id (i.e., the MEC Platform) which the application shall be associated to. Additionally, it includes information on the Service Level Agreements (SLAs) (e.g., communication latency) and the interfaces that are required to be exposed to the VAF.
2. The NFVO validates the request by:
 a. Identifying the appropriate VAF type(s) that is based on the service type/definition indicated in the service request. This is indicated by the service_type parameter in the VAFD file. In this case, the NFVO will identify the relevant VAF using the "MEC Application" service type.
 b. Parsing the VAFD file relevant to the indicated VAF and, for example, identifying the type of resources, interfaces and supported connection type.
3. Based on the parsing of VAFD, the NFVO will request the VIM to allocate resources for the VAF. This step will be skipped in case there is already an active instance of the required VAF.
4. Once the resources are allocated, the VAF will be deployed and instantiated. In addition a VAFR instance will be setup for this application service instance. As part of the instantiation process, the NFVO will pass the configuration_template to the requesting OTT user, in order for it to configure the VAF (for example, via the OSS/BSS and/or the MEC Orchestrator) with relevant parameters. The user will inform the NFVO via the OSS/BSS (and/or the MEC Orchestrator) the configuration parameters of the VAF, which will be maintained inside the VAFR. The configuration parameters shall also indicate the VAF interface(s) that the user requires to be exposed towards the VNF(s). The NFVO will also update the VNFR with the interfaces that the VNF(s) is (are) required to expose towards the VAF for the provisioning of required parameters.
5. The NFVO will be able to determine the appropriate association method, i.e., via VL, via REST API or via some other method, and will establish an association (i.e., connectivity) between the VAFs and the VNF and among the VAFs via the "network controller", which is defined as above as an entity for providing virtual connectivity services. Once they are associated, the VAFs and VNF will exchange with each other relevant parameters via the interfaces exposed towards each other.
6. The NFVO will perform LCM of the VAF and/or its associations during the lifetime of the association when required.
 a. For example, if the NFVO decides to scale out the MEC Platform VNF, then the NFVO may clone the association of some or all the VAFs to the scaled-out MEC Orchestrator instance. The VNFR will be updated with the necessary states to reflect this event. This new association will be triggered by the NFVO towards the VIM, which is then carried out by the "network controller" to provide connectivity services as before. In addition, the NFVO, via the MEC Orchestrator, will inform the VAF of the new "clone association" event in order for the VAF to update any internal states for its operations.
 b. In case a MEC Application is migrated to a new MEC Host, then the NFVO via the VIM and the Network controller will also ensure that the VAF remains associated with the VNF at its new location by migrating the relevant associations.

Figure 8A:
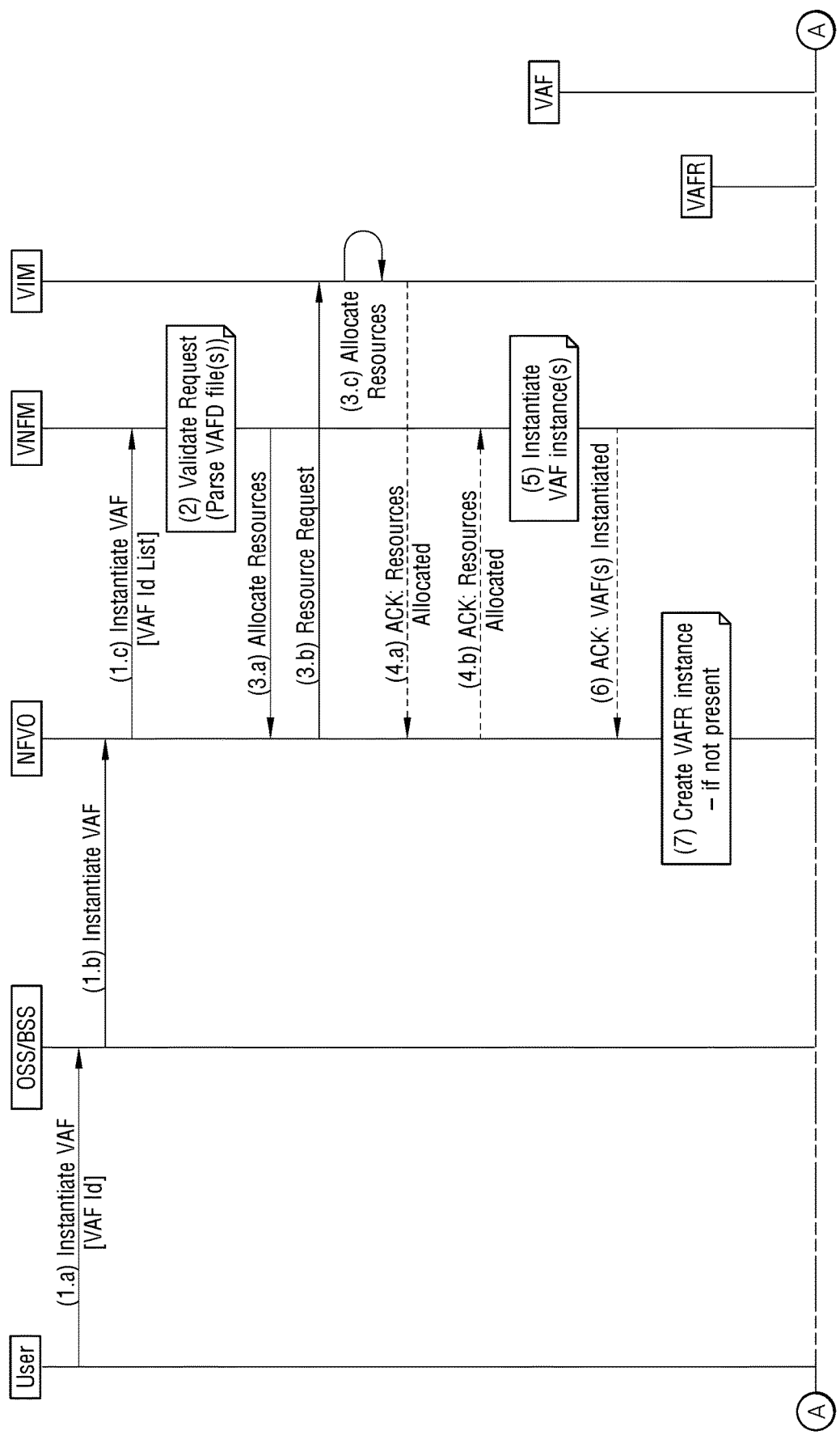
FIG. 8A is an overview of functions/steps/communications in a VAF instantiation process according to an embodiment of the present invention.
Figure 8B:
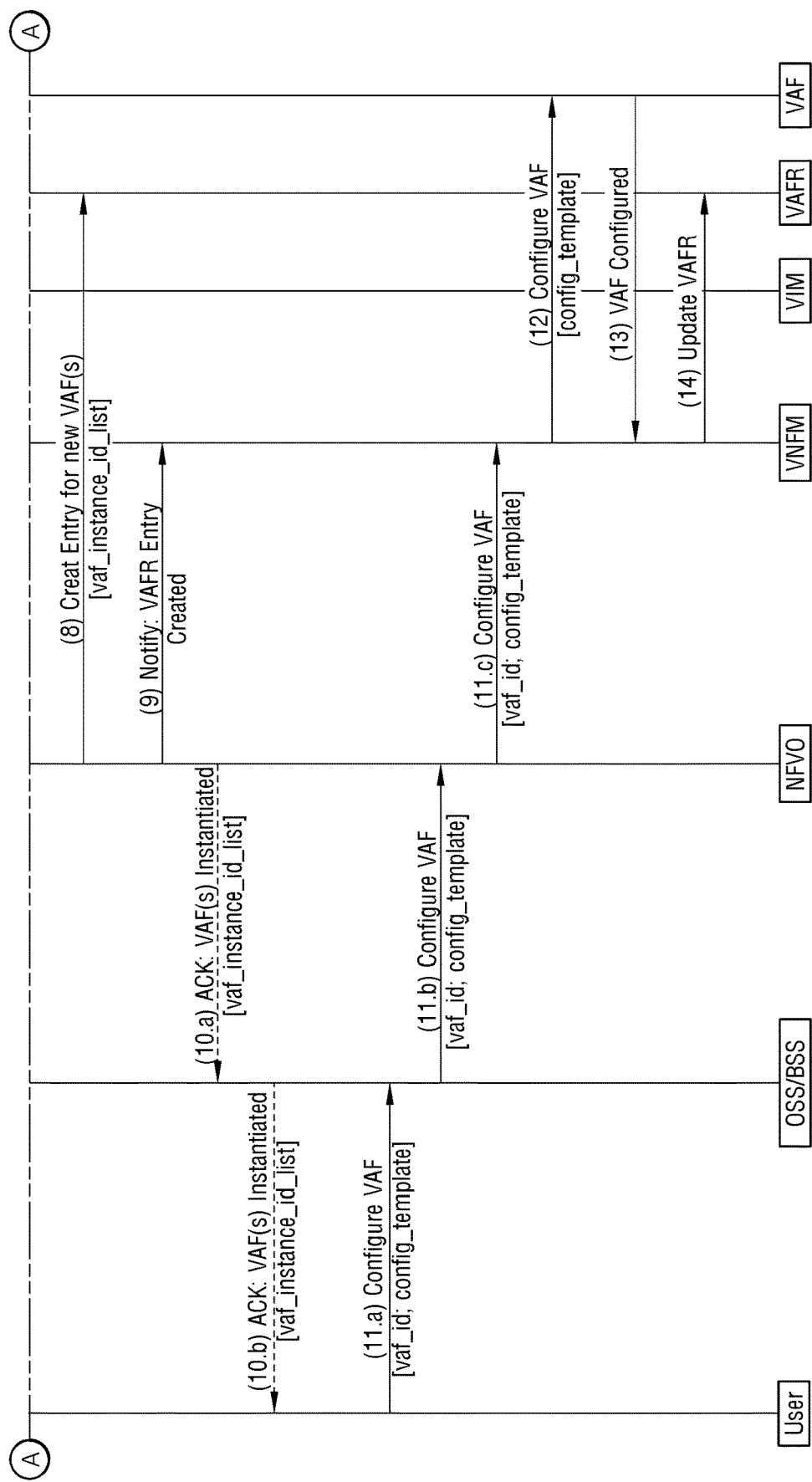
FIG. 8B is a continuation of FIG. 8A from line A-A.

FIGS. 8A and 8B provide an overview of the VAF instantiation process based on a user request. It is assumed that source files for different VAFs and their relevant VAFD files provided by 3rd party application function providers already exist in the system repository and accessible to both the NFVO and VNFM. This embodiment illustrates one of the possible methods of establishing an association between a VAF and underlying VNF(s). A similar method (which also encompasses variants which would be obvious to one skilled in the art) is used for establishing an association between VAF(s) themselves.

As an example, consider the use case scenario depicted in FIG. 5, where the MVNO (here referred to also as the user) desires some advanced network analytics information from the underlying NS that the MVNO owns. Some examples of advanced network analytics function would be to correlate the number of admitted connection requests with the increase in CP/UP load; or the number of admitted connections with the user mobility pattern. It is assumed that the MANO system already has VAFs from third party application providers in its repository and a VAFD entry for each has been created at the time of on-boarding the respective VAFs. The VAFD file is made available to the MVNO via a (G)UI, where it will be able to look into the services/features/functions of different available VAFs and then choose the VAF appropriate and relevant for its needs.

1. The MVNO will then indicate the required VAF, identified by its Id, vendor and version provided in the VAFD, as part of its service request to the NFVO via the OSS/BSS. In this example, the user will interact with the MANO system via the OSS/BSS over the Os-Ma-nfvo reference point. Once selected, the user will request the NFVO, via the OSS/BSS in this example, to instantiate the selected VAF by indicating the VAF Id and/or VAF vendor/version as indicated in the VAFD file for the VAF that the user wants to instantiate. As another embodiment, the NFVO can select the appropriate VAF based on the service type indicated by the user. The NFVO can then parse the VAFDs and select the VAF that best supports the user application service requirements. The NFVO will then send the VAF instantiation request to the VNFM.
2. The VNFM will parse the VAFD for its resource requirements specified by the deployment_flavor information element in the VAFD (see Table 1).
3. The VNFM will indicate the resource requirements for the requested VAF to the NFVO (step 3.a) and the NFVO will relay that to the VIM (step 3.b). The VIM will then reserve and allocate the required resources for the requested VAF instance(s). The process of resource reservation depends on the type of VIM that is being used. For example, in case the VIM is OpenStack then the resource reservation process will follow those prescribed by OpenStack. Note that the resource requirements of a VAF is similar to that of a VNF, i.e., a VAF also requires compute, network, memory and storage requirements that is specified in the relevant VAFD file. The resource reservation process is dependent on the type of VIM.
4. In case of successful reservation of resources, the VIM will send an acknowledgement to the NFVO (step 4.a), and the NFVO will confirm the resource availability to the VNFM (step 4.b).
5. The VNFM will instantiate a VAF as it would do a VNF as per the ETSI ISG NFV specified method.
6. The VNFM will then notify the NFVO of the newly instantiated VAF instance(s). Note that the notification will consist of necessary information such as the id of the newly instantiated VAF instance(s) (i.e., vaf_id).
7. The NFVO will create a VAFR table instance, if not present.
8. The NFVO will create a new entry in the VAFR table with the vaf_id as the Primary Key (see Table 2). In case of multiple VAFs; multiple entries shall be created.
9. The NFVO will then notify the VNFM of the new entry created in the VAFR. Both NFVO and VNFM will have the permission to add/update the relevant parameters within the VAFR table.
10. The NFVO notifies the user of vaf_id(s) of the newly instantiated VAF instance(s).
11. The user can then configure the newly instantiated VAF(s) using the configuration template (i.e., config_template) in VAFD (see Table 1). The configuration parameters are then relayed to the VNFM via the OSS/BSS (over the Os-Ma-nfvo) reference point and VNFM (over the Or-Vnfm reference point).
12. The VNFM then configures the VAF with the configuration parameters specified by the user. The VNFM will be able to configure the VAF instance(s) using configuration interfaces over the Ve-Vnfm-vnf reference point. It is assumed that the NFV MANO system is using a generic VNFM with the necessary provisions to manage VAFs as well. As another variant, the VAF can also be configured by the OSS/BSS (see FIG. 4).
13. The VAF sends a confirmation to VNFM once it is configured and ready.
14. The VNFM will update the config_parameter information element within the relevant entry of VAFR table with information about the configuration parameters.

Figure 9A:
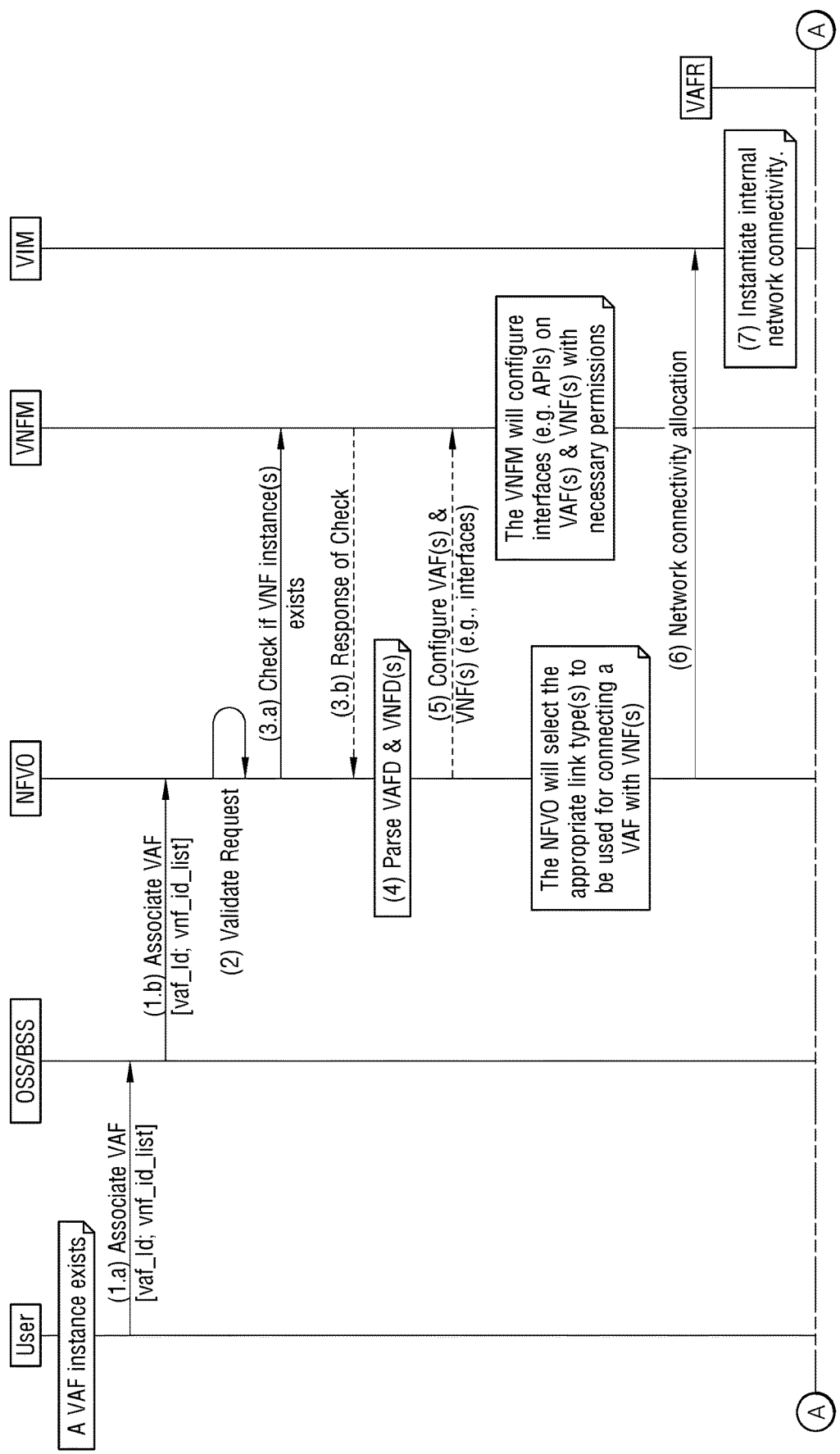
FIG. 9A is an overview of functions/steps/communications in a VAF association process according to an embodiment of the present invention.

After the VAF has been instantiated and configured, it is ready to be associated with VNF(s) as per the user request. In the following, with reference to FIGS. 9A and 9B, a method of associating VAF with VNF(s) according to an embodiment of the present invention is described. FIGS. 9A and 9B provide an overview of the VAF association process based on a user request. The main steps of the process is enumerated below and indicated in FIGS. 9A and 9B.

1. The user will request the NFVO, via the OSS/BSS, for associating the instantiated/configured VAF with the VNF(s) by specifying the VNF ids. It is assumed that the user knows about the VNF(s) with which it wants the VAF to be associated with. The association request will contain a list of VAF ids (vaf_id), VNF ids (vnf_id), and additional information regarding the interfaces exposed by the VAF and the VNF interface(s) towards each other. Not shown, but as an additional step, the user/VAF can request the NFVO for the list of interfaces (or APIs) that a VNF provides with which the VAF wants to associate with.
2. The NFVO will validate the request, both the authorization of the user and the parameters passed inside the request.
3. The NFVO will request VNFM to check if the VNF instance(s) with which the VAF requires association exists or not, and the VNFM will send an appropriate acknowledgement.
4. After a positive acknowledgement, the NFVO will parse the VAFD(s) and the VNFD(s) to confirm/check for which interface(s) are made available by the VAF(s) and VNF(s), and to provide necessary permission for their use/access by each other. In addition, it allows the NFVO to check which type of links (link type) for connectivity is supported by the VNFs and VAFs. This is done for proper mapping of interfaces between the VAFs and the VNFs for establishing connectivity (i.e., association) purposes.
5. At this stage, it could be that the NFVO may ask the VNFM to configure the permission on specified VAF(s) and VNF(s) in order to allow or accept requests on each other specific interfaces (or APIs). It may also indicate the type of parameters that a VAF and/or VNF may require from each other for processing etc. The NFVO can also ask the user to configure the VAF(s) via the Graphical User Interface (GUI).

6. The NFVO will then send a request to the VIM (over the Or-Vi reference point) for instantiating a connectivity network between the specified VAF(s) and the VNF(s). In this request, the NFVO also specifies the connectivity requirements, including supported link-type by the VAF(s) (i.e., connection type information element in VAFD) and any other connection parameters.

7. The VIM will check for relevant resources and reserve them required for instantiating an internal connectivity network for enabling the association between the VAF(s) and specified VNF(s). Resources can include availability of IP addresses and/or available ports on the vSwitch, required bandwidth, virtual-link delays, etc. It may also include the VIM to provide connectivity policy to the underlying network controller (e.g., an SDN controller) for establishing relevant connectivity/forwarding/processing rules on the underlying (v)switches (e.g., open flow (virtual) switches).

8. The VIM will acknowledge the completion of the instantiation of the requested connectivity network providing the details of the network resources reserved for the purpose.

9. At this stage, the NFVO may request the VNFM to configure the VAF(s) and VNF(s) for connectivity purposes, for example configuring virtual interfaces, assigning IP addresses, subnet mask, default gateway, REST server, etc. As part of the configuration the VAF should also be provided with the details of the VNF (i.e., id, interfaces, IP address, port id, etc.) with which it is being associated with. Similarly, a VNF may also be provided with the details of the VAF with which it is being associated with.

10. The NFVO will then request the VIM to establish association (i.e., connectivity) between the VAF(s) and VNF(s) over the newly instantiated connectivity network (see steps 6 and 7). (Depending on the application type, both the VAF and VNF may also discover each other over their respective interfaces exposed towards each other once the underlying connectivity network is established).

11. Once connected, the VIM will send an acknowledgement to the NFVO,

12. The NFVO will update the relevant entries in the VAFR tables with necessary information (see Table 2).

13. The NFVO will then relay the acknowledgement of the VAF and VNF association to the VNFM and the user via the OSS/BSS of successful association.

The steps 1-13 above will also be repeated for each new "association spawning" request. Based on the process overview described above, those skilled in the art will be able to develop processes for other LCM operations like association cloning, association migration, etc., or even establish association between two or more VAF(s) as described in the second use case example.

To further explain the requirements needed to establish an association between a VAF and VNF, there could be many steps that the VIM needs to take up as part of step 7 described above. For example, the VIM may require to:

1. Create a Virtual Local Access Network (VLAN) segment, and hence an Internet Protocol (IP) subnet domain, specific for hosting VAFs. This would entail setting up a virtual router or a virtual switch to connect the VAF-specific VLAN segment to other network segments that hosts the relevant VNF(s) to which the VAF wants to associate with.

2. Create VLAN for assigning the associated VAF(s) and VNF(s) in the same VLAN segment.

3. Provide configuration information such as, IP address(es), subnet mask, default gateway address, creating virtual interfaces, etc.

4. Configure virtual routers/switches in order to ensure connectivity between the VAF(s) and VNF(s) in different network segments.

5. Configure the policy of a network controller (e.g., a Software Defined Network (SDN) controller) to ensure connectivity between them.

Thus, embodiments of the present invention provide a method/system that will enable the standard NFV MANO system to dynamically manage and orchestrate AFs (virtualized and non-virtualized) and their association with the underlying NS/VNF for providing relevant services to the users and/or NS/VNF and/or the MANO system itself, thereby effecting technical extensions and improvements in the functioning and operability of the NFV MANO system itself. Specifically, some particular advantages provided in embodiments of the present invention include:

1. A VAF Catalogue containing the VAFD files describing different type of VAFs that are on-boarded to the NFV MANO repository, wherein the NFVO and VNFM have access to the VAFD.

2. A VAFR for maintaining the run-time state information and management information of the VAF and its associations, wherein this VAFR is accessible by both the NFVO and VNFM.

3. Support of run-time management operations over the VAF associations that includes, but is not limited to, basic operations like create/configure/delete association, and new operations like spawn association, clone association, scale association, transfer association, and migrate association with reference to the underlying VNF/NS instance(s) to which the VAF is associated with.

According to an embodiment of the present invention, a method for enabling VAFs to associate to underlying VNFs, comprises the steps of:

1) Receiving a service request from a user indicating the type of application service the user requires and the VNF(s) and/or NS id that the user wants the service from.

2) Requesting validation by the NFVO by parsing the newly proposed VAFD file within the VAF catalogue.

3) Deploying and instantiating of the VAF instance by the NFVO, its configuration by the user and creation of a VAFR instance for maintaining the state of the VAF and its associations.

4) Establishing, by the NFVO, an association between the VAF and the VNF(s) with the assistance of VIM and the underlying Network Controller.

5) Exercising LCM of the VAF and its associations by the NFVO over the existing reference points.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for enabling application functions (AFs) to associate to underlying virtualized network functions (VNFs) in a Network Function Virtualization (NFV) environment in which a lifecycle management (LCM) of the AFs and its associations with the underlying VNFs and resources are managed by the NFV Management and Orchestration (MANO) system, the method comprising:
receiving a service request indicating a type of application service and at least one of a VNF or a network service (NS);
validating the service request by an NFV Orchestrator (NFVO) parsing an AF Descriptor (AFD) file within an AF catalogue, the AFD being a deployment template having information on features, services, capabilities, operations, interfaces offered by a respective AF, and connectivity, resource and interface requirements useable in the NFV MANO system to establish one or more associations between the respective AF and at least one respective underlying VNF which is coupled to other underlying VNFs in a VNF Forwarding Graph (VNFFG) to deliver an underlying NS;
deploying and instantiating of the respective AF by the NFVO;
creating an AF Record (AFR) instance having information useable to maintain a state and the one or more associations of the respective AF;
establishing, by the NFVO in cooperation with a Virtualized Network Function Manager (VNFM), Virtualized Infrastructure Manager (VIM) and an underlying network controller of the NFV MANO system, the one or more associations between the respective AF and the at least one respective underlying VNF using the AFD, wherein the one or more associations are each a dynamic connection which is removable while the underlying NS is being provided using the VNFFG without impacting operation of the at least one underlying VNF to deliver, together with the other underlying VNFs in the VNFFG, the underlying NS and without requiring a change in the VNFFG; and
performing, by the NFVO over existing standard reference points of the NFV MANO system, LCM of the respective AF and the one or more associations of the respective AF.

2. The method according to claim 1, wherein the NFVO identifies the respective AF using a service type included in the service request and a parameter in the AFD of the respective AF indicating the service type.

3. The method according to claim 1, wherein the deploying and instantiating of the respective AF by the NFVO includes sending, by the NFVO, a configuration template of the AFD to the user such that the respective AF is configurable by the user on user equipment.

4. The method according to claim 1, wherein the performing of LCM of the respective AF includes scaling-out of the at least one respective underlying VNF by cloning the association of the respective AF to a scaled-out instance of the at least one respective underlying VNF so as to create a new association between the respective AF and the scaled-out instance of the at least one respective underlying VNF.

5. The method according to claim 1, wherein the performing of LCM of the respective AF includes migrating of the at least one respective underlying VNF such that the NFVO, in cooperation with the VNFM, VIM and the underlying network controller of the NFV MANO system, ensures that the respective AF remains associated with the at least one respective underlying VNF at a new location.

6. The method according to claim 1, wherein the performing of LCM of the respective AF includes scaling of the at least one respective underlying VNF and the association between the respective AF and the at least one respective underlying VNF.

7. The method according to claim 1, wherein the performing of LCM of the respective AF includes transferring of the respective AF and the association between the respective AF and the at least one respective underlying VNF to at least one other VNF.

8. The method according to claim 1, wherein the AFR indexes resources allocated to the AFs, ids with which the AFs are associated, interfaces which are exposed by the AFs towards the VNFs and interfaces which are exposed by the VNFs toward the AFs and the LCM events on the AFs.

9. The method according to claim 8, wherein the NFVO updates the AFR instance to include the interfaces which are to be exposed towards the at least one respective underlying VNF in order to provision services to the user in accordance with the service request.

10. The method according to claim 1, wherein, based on the parsing of the AFD, the NFVO requests the VIM to allocate resources to the respective AF.

11. The method according to claim 1, wherein the service request is received from an end user, a MANO, a VNF-NS or an operator.

12. The method according to claim 1, wherein the respective AF is virtualized.

13. The method according to claim 1, wherein the VNFs implement the underlying NS which is characterized by the VNFFG which references Virtual Links (VLs) connecting the VNFs to each other, and wherein the AFR includes information about interfaces of the respective AF and the at least one underlying VNF exposed toward each other in the one or more dynamic connections of the one or more associations.

14. A computer system for enabling application functions (AFs) to associate to underlying virtualized network functions (VNFs), the computer system comprising:
a Network Function Virtualization (NFV) Management and Orchestration (MANO) system including an NFV Orchestrator (NFVO), Virtualized Network Function Manager (VNFM), and Virtualized Infrastructure Manager (VIM);
an AF Descriptor (AFD) file within an AF catalogue, the AFD being a deployment template having information on features, services and capabilities offered by a respective AF, and connectivity, resources and interface requirements useable in the NFV MANO system to establish one or more associations between a respective AF and at least one respective underlying VNF which is coupled to other underlying VNFs in a VNF Forwarding Graph (VNFFG) to deliver an underlying NS; and
an AF Record (AFR) which indexes resources allocated to the AFs, ids with which the AFs are associated, interfaces which are exposed by the AFs towards the VNFs and interfaces which are exposed by the VNFs toward the AFs, wherein the NFVO is configured to:
- validate a service request by parsing the AFD file, the service request indicating a type of application service and at least one of a VNF or a network service (NS);
- deploy and instantiate the respective AF;
- create an AF Record (AFR) instance having information useable to maintain a state and the one or more associations of the respective AF;
- establish, in cooperation with a Virtualized Network Function Manager (VNFM), Virtualized Infrastructure Manager (VIM) and an underlying network controller of the NFV MANO system, the one or more associations between the respective AF and the at least one respective underlying VNF using the AFD, wherein the one or more associations are each a dynamic connection which is removable while the underlying NS is being provided using the VNFFG without impacting operation of the at least one underlying VNF to deliver, together with the other underlying VNFs in the VNFFG, the underlying NS and without requiring a change in the VNFFG; and
- perform, over existing standard reference points of the NFV MANO system, Lifecycle Management (LCM) of the respective AF and the one or more associations of the respective AF.

15. The computer system according to claim 14, wherein the NFVO, VNFM, VIM are configured to identify the respective AF using a service type included in the service request and a parameter in the AFD of the respective AF indicating the service type.

16. The computer system according to claim 14, wherein the NFVO is configured to perform at least one of association cloning, association migration, association scaling or association transfer to perform the LCM of the respective AF.

17. The computer system according to claim 14, wherein the NFVO, VNFM and VIM are configured to update the AFR instance to include the interfaces which are to be exposed towards the at least one respective underlying VNF in order to provision services to the user in accordance with the service request.

18. The computer system according to claim 14, wherein the AFs are virtualized.

19. A non-transitory, tangible computer-readable medium having instructions thereon which, under execution by one or more processors, provide for the following steps to be carried out by an NFV Orchestrator (NFVO) of a Network Function Virtualization (NFV) Management and Orchestration (MANO) system for enabling application functions (AFs) to associate to underlying virtualized network functions (VNFs):
- validating a service request by parsing an AF Descriptor (AFD) file within an AF catalogue, the AFD being a deployment template having information on features, services and capabilities offered by a respective AF, and connectivity, resource and interface requirements useable in the NFV MANO system to establish one or more associations between a respective AF and at least one respective underlying VNF which is coupled to other underlying VNFs in a VNF Forwarding Graph (VNFFG) to deliver an underlying network service (NS), the service request indicating a type of application service and at least one of a VNF or an NS;
- deploying and instantiating of the respective AF;
- creating an AF Record (AFR) instance having information useable to maintain a state and the one or more associations of the respective AF;
- establishing, in cooperation with a Virtualized Infrastructure Manager (VIM) and an underlying network controller of the NFV MANO system, the one or more associations between the respective AF and the at least one respective underlying VNF using the AFD, wherein the one or more associations are each a dynamic connection which is removable while the underlying NS is being provided using the VNFFG without impacting operation of the at least one underlying VNF to deliver, together with the other underlying VNFs in the VNFFG, the underlying NS and without requiring a change in the VNFFG; and
- performing, over existing standard reference points of the NFV MANO system, Lifecycle Management (LCM) of the respective AF and the one or more associations of the respective AF.

20. The computer-readable medium according to claim 19, wherein the AFs are virtualized.

* * * * *